(12) United States Patent
Wise et al.

(10) Patent No.: US 7,666,939 B2
(45) Date of Patent: Feb. 23, 2010

(54) DISPERSIONS OF CARBON NANOTUBES IN POLYMER MATRICES

(75) Inventors: Kristopher Eric Wise, Hampton, VA (US); Cheol Park, Yorktown, VA (US); Emilie J. Siochi, Newport News, VA (US); Joycelyn S. Harrison, Hampton, VA (US); Peter T. Lillehei, Yorktown, VA (US); Sharon E. Lowther, Hampton, VA (US)

(73) Assignees: National Institute of Aerospace Associates, Hampton, VA (US); The United States of America as represented by the Administrator of NASA, Washington, DC (US)

( * ) Notice: Subject to any disclaimer, the term of this patent is extended or adjusted under 35 U.S.C. 154(b) by 202 days.

(21) Appl. No.: 11/432,201

(22) Filed: May 11, 2006

(65) Prior Publication Data

US 2006/0270777 A1    Nov. 30, 2006

Related U.S. Application Data

(60) Provisional application No. 60/680,612, filed on May 13, 2005.

(51) Int. Cl.
*C08K 3/04* (2006.01)
(52) U.S. Cl. ....................... 524/495; 524/496
(58) Field of Classification Search ................ 524/495, 524/496
See application file for complete search history.

(56) References Cited

U.S. PATENT DOCUMENTS

| 2002/0004028 A1 | 1/2002 | Margrave et al. |
| 2002/0110513 A1 | 8/2002 | Margrave et al. |
| 2003/0001141 A1 | 1/2003 | Sun et al. |
| 2003/0158323 A1 | 8/2003 | Connell et al. |
| 2006/0041104 A1 | 2/2006 | Ait-Haddou et al. |
| 2006/0054866 A1 | 3/2006 | Ait-Haddou et al. |
| 2006/0057361 A1 | 3/2006 | Ounaies et al. |

*Primary Examiner*—Kriellion A Sanders
(74) *Attorney, Agent, or Firm*—George F. Helfrich; Kimberly A. Chasteen; Linda B. Blackburn

(57) ABSTRACT

Dispersions of carbon nanotubes exhibiting long term stability are based on a polymer matrix having moieties therein which are capable of a donor-acceptor complexation with carbon nanotubes. The carbon nanotubes are introduced into the polymer matrix and separated therein by standard means. Nanocomposites produced from these dispersions are useful in the fabrication of structures, e.g., lightweight aerospace structures.

13 Claims, 3 Drawing Sheets

DISPERSIONS OF CARBON NANOTUBES IN POLYMER MATRICES

CROSS-REFERENCE TO RELATED APPLICATION

This application claims the benefit of U.S. Provisional Application No. 60/680,612, filed on May 13, 2005 for "Stable Dispersions of Single Walled Carbon Nanotubes in Polymer Matrices Using Donor-Acceptor Bonding."

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Cooperative Agreement No. NCC-1-02043 awarded by the National Aeronautics and Space Administration.

BACKGROUND OF THE INVENTION

1. Field of the Invention

This invention relates generally to dispersions of carbon nanotubes in polymer matrices. It relates particularly to dispersions of carbon nanotubes in polymer matrices employing donor-acceptor bonding, which dispersions exhibit long term stability and are suitable for the preparation of nanocomposites.

2. Description of Related Art

Carbon nanotubes, which are now well-known in the art, are being employed in, and proposed for a number of applications which take advantage of their unique combination of physical properties, e.g., their strength and weight. For example, state-of-the-art lightweight aerospace structures are presently built from graphite fiber composites. It is proposed that with their impressive combination of properties, carbon nanotube nanocomposites will surpass the performance of present day conventional graphite fiber composites by providing both load-bearing and sensing functionalities in vehicle structures.

However, this is not possible until problems associated with the use of carbon nanotubes are resolved. In particular, prior efforts to achieve a high degree of dispersion of carbon nanotubes in a polymer matrix have been fraught with difficulty, due primarily to the high affinity of carbon nanotubes for each other (i.e., their tendency to agglomerate in bundles) and their rather weak interaction with common polymers.

Prior efforts, using a combination of mechanical mixing, sonication, and in situ polymerization techniques, have been found wanting, in that they have yielded dispersions which are kinetically stable, but which tend to phase separate over a period of days or weeks, indicating thermodynamic instability.

BRIEF SUMMARY OF THE INVENTION

It is accordingly the primary object of the present invention to obviate the inadequacies of the prior art and to provide what is not available therein, viz., a dispersion of carbon nanotubes in a polymer matrix, which dispersion is characterized by long term stability and eminent suitability for use in the preparation of nanocomposites.

This primary object and its attending benefits are fully achieved by introducing carbon nanotubes into a polymer matrix and separating the carbon nanotubes in the polymer matrix by standard means, such as high-shear flow processing and sonication, the polymer matrix having moieties therein which are capable of a donor-acceptor complexation with the carbon nanotubes.

The donor-acceptor complexation results in a transfer of electronic charge between the carbon nanotubes and the polymer matrix, effecting an attractive interaction therebetween, which attractive interaction is neither an ionic nor a covalent bond between the carbon nanotubes and the polymer matrix.

Nanocomposites produced from the instant stable dispersion of carbon nanotubes in the polymer matrix find numerous applications, e.g., in the fabrication of lightweight aerospace structures.

BRIEF DESCRIPTION OF THE SEVERAL VIEWS OF THE DRAWINGS

For a more complete understanding of the present invention, including its primary object and attending benefits, reference should be made to the Detailed Description of the Invention, which is set forth below. This Detailed Description should be read in the light of the accompanying Drawings, wherein.

DETAILED DESCRIPTION OF THE INVENTION

Figure 1:
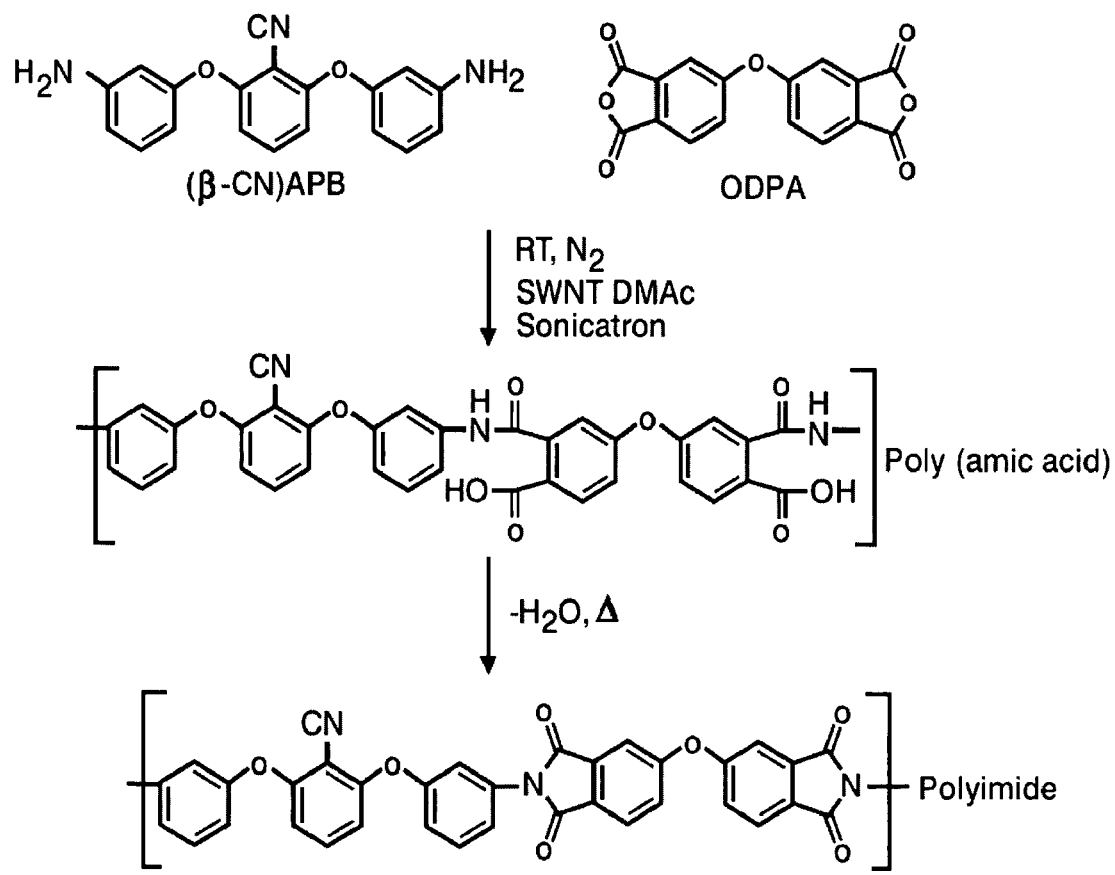
FIG. 1 is a schematic illustrating the synthetic route to the preparation of 2,6-bis(3-aminophenoxy) benzonitrile ((beta-CN)APB)/4,4-oxydiphthalic anhydride (ODPA)

The present invention is a dispersion of carbon nanotubes in a polymer matrix. The dispersion exhibits long term stability, and is eminently suitable for the preparation of nanocomposites.

The carbon nanotubes employed in the present invention are presently available commercially. They may be single-walled carbon nanotubes, double-walled carbon nanotubes, few-walled carbon nanotubes (i.e., those having from about 3 to about 10 walls, as understood by those of skill in this art), or multi-walled carbon nanotubes (i.e., those having greater than about 10 walls, as understood by those of skill in this art.)

The carbon nanotubes are advantageously introduced into the polymer matrix and separated therein by standard means available to the skilled artisan, among which are high-shear flow processing and sonication.

Many polymers available in the art may constitute the polymer matrix of the present invention and afford very beneficial results. However, any polymer employed must have moieties therein which are capable of a donor-acceptor complexation with the carbon nanotubes.

Such a donor-acceptor complexation results in a transfer of electronic charge between the polymer matrix and the carbon nanotubes therein, resulting in an attractive interaction therebetween, which is neither an ionic nor a covalent bond between the polymer matrix and the carbon nanotubes. Highly beneficial results are indeed obtained when this donor-acceptor complexation is augmented by an attractive London dispersion interaction between cofacially stacked pi electron systems.

Effective donor-acceptor complexation with the carbon nanotubes is advantageously achieved if the polymer matrix has been previously functionalized, i.e., if the polymer matrix has been functionalized with either an electron-donating or an electron-accepting functional group prior to the introduction of carbon nanotubes therein. (Carbon nanotubes have been found to exhibit amphoteric behavior when forming donor-acceptor camplexes with the polymer matrix.)

As an equally-acceptable alternative approach, the dispersion of the present invention is advantageously prepared by first mixing monomeric components of the polymer making up the polymer matrix with the carbon nanotubes, which monomeric components have been previously functionalized with either an electron-donating or an electron-accepting functional group, followed by polymerization of these monomeric components in the presence of the carbon nanotubes.

In a preferred embodiment of the present invention, as set forth below as an Example, the functionalized polymer matrix employed is a nitrile-functionalized polymer matrix. However, it is understood that many other functionalities may be employed within the spirit and scope of the present invention, as defined in the hereto-appended claims. Specifically, the nitrile-functionalized polymer matrix employed in the Example below is (beta-CN)APB/ODPA.

Nanocomposites having outstanding properties are advantageously and beneficially prepared from the stable dispersion of the present invention.

EXAMPLE

The procedures described below were performed using purified laser ablated (LA) and high pressure carbon monoxide (CO) decomposition (HiPco) single wall carbon nanotubes (SWNTs). The LA and HiPco SWNTs were purchased from Rice University and Carbon Nanotechnologies, Inc., respectively. The LA and HiPco SWNTs were about 1.2-1.6 nm and 0.8 nm in diameter, respectively. The concentration of the catalysts in both the purified LA (Ni and Co) and HiPco (Fe) SWNTs was less than 3 wt % based on elemental analysis (Desert Analytics, ICP-MS). The polymer chosen for this work was (β-CN)APB/ODPA polyimide, the structure of which is shown in FIG. 1. Through energy-filtered transmission electron microscopy (EELS), (β-CN) APB/ODPA polyimide has been shown to wet SWNTs very well. This particular polyimide was selected because of the presence of a nitrile functionalized aromatic moiety. Nitrile bearing aromatic compounds are generally good electron acceptors due to their ability to accommodate excess charge in low lying unoccupied orbitals. Of particular relevance is recent knowledge concerning the adsorption of 9,10-anthracenedicarbonitrile on SWNT. It is now known that of a series of substituted anthracenes, the dicarbonitrile derivative exhibited the highest adsorption coverage. This result is attributed to a higher SWNT binding affinity promoted by stronger charge transfer interactions.

For the purposes of forming a composite with well dispersed SWNT reinforcement, the following procedure was employed. It is schematically depicted in FIG. 1. A dilute SWNT suspension, typically around 0.05 wt %, in N,N-dimethylacetamide (DMAc), was prepared by homogenizing for 10 min (750 rpm with a 6 mm diameter rotor homogenizer) and sonicating for 1 h at 47 kHz. The sonicated SWNT suspension was used as a solvent for the poly(amic acid) synthesis with the diamine, 2,6-bis(3-aminophenoxy) benzonitrile ((β-CN)APB), and the dianhydride, 4,4-oxydiphthalic anhydride (ODPA). The entire reaction was carried out with stirring in a nitrogen-purged flask immersed in a 40 kHz ultrasonic bath until the solution viscosity increased and stabilized. Sonication was stopped and stirring continued for several hours to form a SWNT-poly(amic acid) solution. The unimidized SWNT poly(amic acid) solutions exhibited excellent stability, remaining in solution for over two years in sealed bottles under refrigeration.

A series of SWNT-polyimide nanocomposite films with SWNT concentrations of 0, 0.02, 0.1, 0.2 and 0.5 wt % were prepared in the following manner. The SWNT-poly(amic acid) solution was cast onto a glass plate and dried in a dry air-flowing chamber. Subsequently, the dried tack-free film was thermally imidized in a nitrogen-circulating oven to obtain a solvent-free SWNT-polyimide film. The transparent films containing SWNTs were deep green in color while pristine films were pale yellow.

One mechanism consistent with both long term dispersion stability and the observed color change is the formation of an electron donor-acceptor (EDA) complex between the nanotube filler and the polymer matrix. EDA complexes, formed between a molecule of high electron affinity and another of low ionization potential, are not covalently bound, but can nevertheless be quite stable. Previous reports have shown that SWNTs behave amphoterically (in a Lewis acid/base sense), interacting strongly with both electron donors and electron acceptors. Many of these studies have focused on alkali metals as donors and halogens as acceptors, due to their low ionization potentials and high electron affinities, respectively. Other work has employed various small molecules as electron donors ($NH_3$, $H_2$) and electron acceptors ($NO_2$, $O_2$). Finally, reports describing doping by larger organic molecules (various aromatic acceptors and organic amine donors, as well as by polymers functionalized with donor or acceptor groups have appeared. The cited literature suggests that the direction of any charge transfer found in the present situation can be controlled by the electron donating/electron accepting nature of the polymer matrix.

SWNT composites prepared using related polyimides synthesized from ODPA monomers and other diamines showed no noticeable color change. Based on these negative results, ODPA was provisionally eliminated as the active participant in the proposed EDA complex with the SWNT. To test for the involvement of the (β-CN)APB diamine monomer, a solution of the monomer in DMAc was prepared and observed to be pale yellow in color. Upon addition of SWNTs the solution immediately turned green, as observed in the composite described above. These qualitative observations support the concept of EDA complex formation between SWNTs and the polymer matrix, evidently via the (β-CN)APB monomers.

To further examine the role of EDA interactions in stabilizing the SWNT/(β-CN)APB/ODPA composite, Raman spectroscopy was employed to probe the impact of the EDA interaction on the electronic structure of the SWNT. Raman scattering spectra were taken using an Almega™ dispersive Raman spectrometer (Thermo Nicolet). A 532 nm incident laser light excitation was employed and the laser beam was focused on the sample with the aid of an optical microscope. Low excitation laser power (15 mW) was used to minimize heating of samples, which often caused downshifting of the observed peaks. The spectrum of a reference sample of pure SWNT was monitored through the entire procedure and Raman shift of the G band caused by heating was less than 1 $cm^{-1}$.

Previous experimental and theoretical work have shown that doping SWNTs with either electron donors or acceptors, or electrochemically, resulted in noticeable shifts in certain characteristic vibrational modes. Specifically, removing charge from a SWNT (i.e. p-doping or oxidizing) resulted in an upshift in the G band peak around 1592 cm$^{-1}$, while adding charge (i.e. n-doping or reducing) to a SWNT resulted in a downshift. The downshift observed upon n-doping is easily understood: as the additional electron density is placed in the antibonding conduction bands of the SWNT, the average C—C bond strength is weakened, resulting in a downshift or softening of the vibrational frequency. The reason for the upshift that occurs upon p-doping is less obvious. One would intuitively expect that removing electron density from the fully occupied, bonding valence band of a SWNT would weaken the C—C bonding, resulting in a downshift in the G band frequency. This was not, in fact, what was observed. One explanation for this behaviour is that the addition of some sp$^3$ character to the sp$^2$ hybridized orbitals, which results from the curvature of the graphitic structure required to form a tube, results in Coulomb repulsion, particularly in small diameter tubes. Removing electron density from these orbitals reduces the repulsion, resulting in stronger net bonding and a higher G band frequency.

Figure 2A:
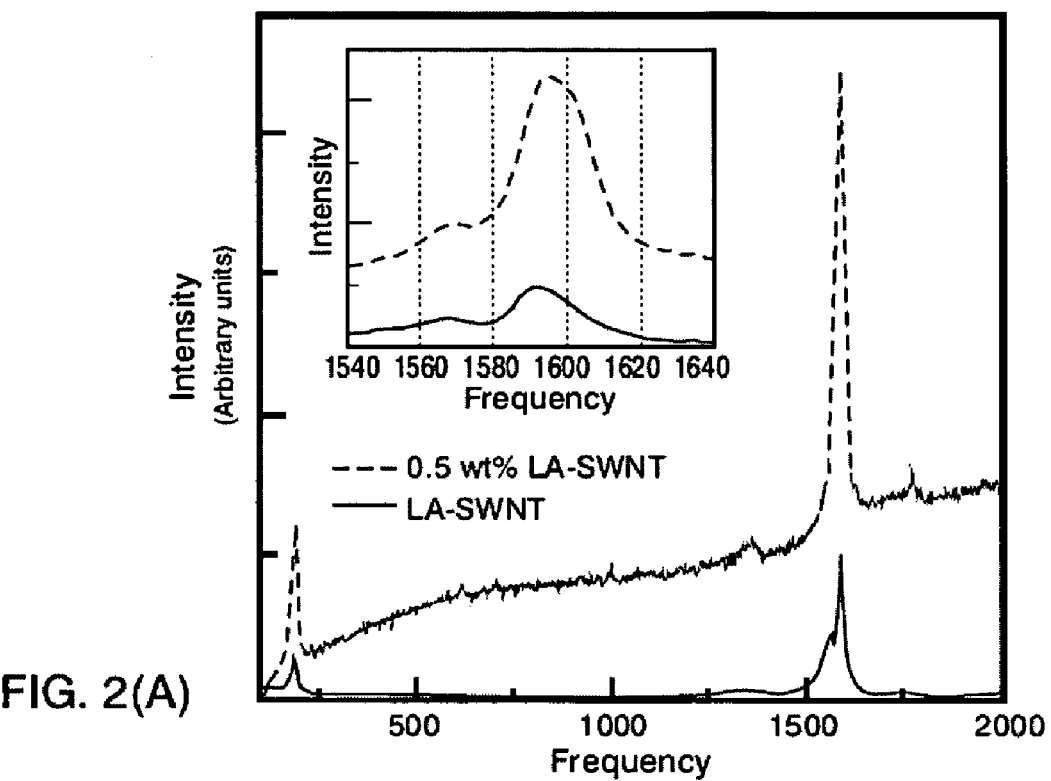
FIG. 2A presents graphs showing Raman Spectra of laser ablated (LA) single walled carbon nanotubes (SWNTs) in isolation and in 0.5 wt. % composite.
Figure 2B:
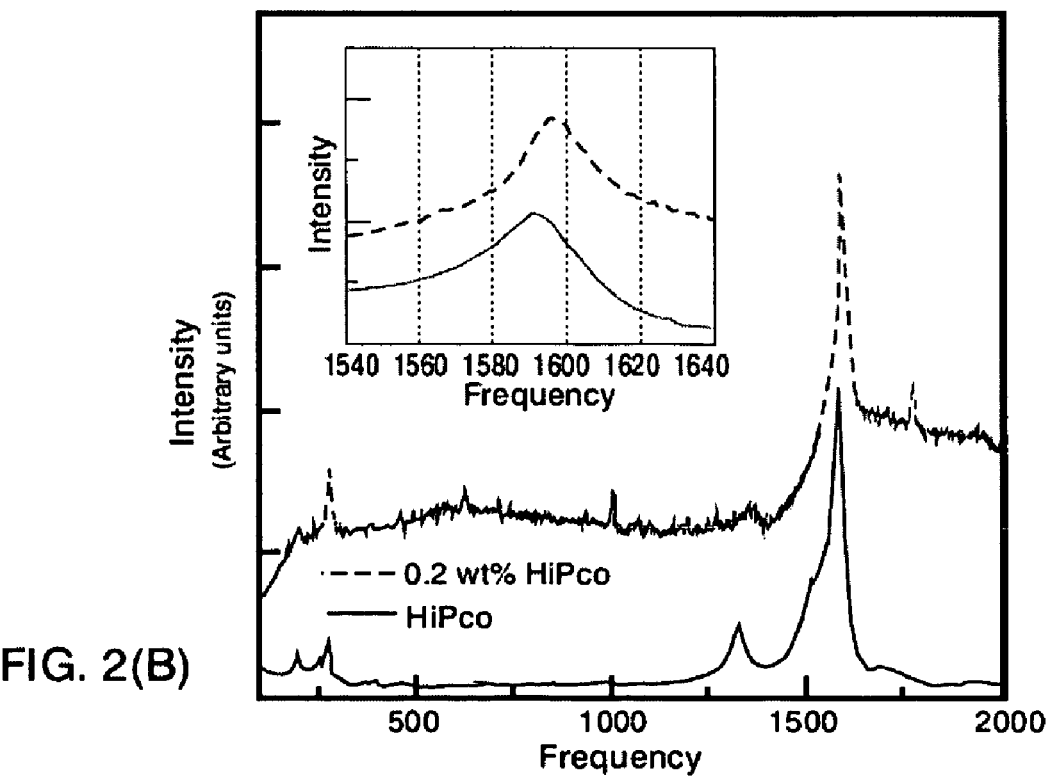
FIG. 2B presents graphs showing Raman Spectra of high pressure carbon monoxide decomposition (HiPco) single walled carbon nanotubes (SWNNTs) in isolation and in 0.2 wt. % composite.

Based on these considerations, if the SWNTs were to lose charge to the polymer matrix, one would expect an upshift in the G band and, conversely, a downshift is expected if charge is gained from the matrix. FIG. 2a shows the measured Raman spectra of the laser ablated tubes before and after dispersion in the (β-CN)APB/ODPA matrix at a concentration of 0.5%. An upshift of 4 cm$^{-1}$ is observed in the G band. Similar results are found for a 0.2% composite using HiPco tubes (4 cm$^{-1}$ upshift), as shown in FIG. 2b. While the magnitude of this peak shift is relatively small, it is virtually constant across a range of concentrations and is very reproducible. In contrast to the disorder induced dispersive D band and its related second-order harmonic G' band, the G band is not highly sensitive to hydrostatic pressure or strain. The upshift of the G band was not observed with other polymers such as polystyrene, poly(methyl methacrylate), or the structurally similar CP2 polyimide, none of which have a strong electron withdrawing group. This indicates that hydrostatic pressure or strain, caused by thermal expansion mismatch between SWNT and the matrix, does not significantly influence the position of the G band peak.

Figure 3:
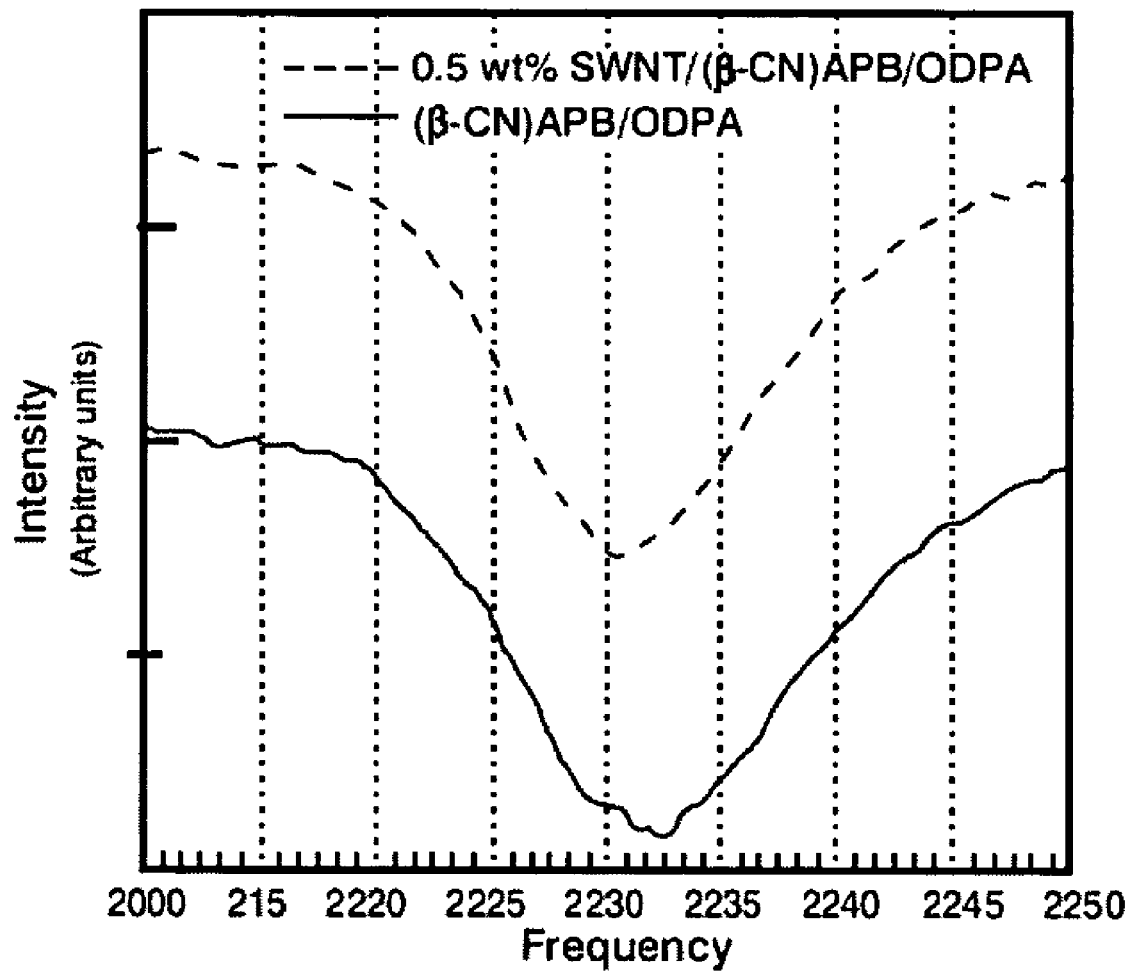
FIG. 3 presents graphs showing FTIR Spectra of pure (beta-CN)APB/ODPA and 0.5 wt. % LA SWNT composite in the nitrile stretching region; the peak has been downshifted by about 2 $cm^{-1}$ in the composite.

To evaluate the participation of the polymer matrix as an acceptor in the proposed EDA complex, an FTIR spectrometer was used to collect nitrile stretching mode shift in an ATR mode with a Nicolet Continuum IR microscope. FIG. 3 shows the spectral region containing the CN stretching mode for a pristine (β-CN)APB/ODPA film and for a 0.5% laser ablated SWNT/polyimide composite. If the nitrile group in the (β-CN)APB monomer were acting as a Lewis acid and withdrawing charge density from the SWNT, one would expect to observe a downshift in the CN stretching mode due to partial occupation of the low lying antibonding acceptor orbital. A downshift of approximately 2 cm$^{-1}$ was in fact observed in this case. Interestingly, spectra taken on samples with higher SWNT loadings showed no increase in the magnitude of the shift. This invariance indicates that SWNT/matrix coordination is saturated, even at the lowest loading level (0.02 wt %), although it is unclear why this should be the case. The downshift observed, while small, is reproducible and consistent with the EDA model of the interaction.

A computational study of this system initiated to augment understanding of the nature of the SWNT-matrix interaction in this composite is briefly described here. While it is not currently possible to perform quantum chemical calculations for systems of this size, qualitative insight may be gained by performing calculations on small analogs of the polymers (monomers, dimers, etc) and extrapolating the results to larger systems. One way of assessing the likelihood of electron transfer from the SWNT to the polymer matrix is to consider the relative electronic chemical potentials (μ) of the two components. When two systems of differing electronic chemical potential are brought into contact, the composite system will reach an intermediate potential, i.e. equalize, through a process of charge transfer. For periodic materials with band type electronic structure, the chemical potential is simply the negative of the Fermi level which, for metallic or small band gap semiconducting tubes, is essentially the negative of the work function (neglecting the dipole potential)

$$\mu_{NT} = -E_F \cong -WF_{NT},$$

$$WF_{NT} \cong 4.8\text{-}5.0 \text{ eV}.$$

The situation is similar for molecular materials with localized electronic structure, except that the chemical potential is defined as the negative of the electronegativity. The molecular electronegativity, within the finite difference approximation, is calculated as the negative of the average of the ionization potential and the electron affinity $$\mu_P = -\chi_P,$$

$$\chi_P \cong (IP+EA)/2.$$

The geometry of a (β-CN)APB/ODPA monomer was optimized using the B3LYP density functional method with a 6-31G* basis set. The geometries of the radical cation and anion were optimized starting from the neutral geometry. Finally, single point energy calculations were performed at these geometries using the larger 6-31+G* basis set. This basis set adds diffuse functions to the heavy atoms which are known to be particularly important in anions. While the per monomer charge transfer in the real polymer composite is much less than a full electron, this calculation provides a limiting value. All calculations were done using either G$_{AMESS}$ or NWChem4.

Using the B3LYP/6-31+G* calculated energies of the neutral, radical cation, and radical anionic forms of the (β-CN)APB/ODPA monomer, the ionization potential and electron affinity were found to be 8.64 and 1.58 eV, respectively. The average of these numbers is the Mulliken electronegativity of the monomer, 5.11 eV. Rather than calculating the chemical potential of a SWNT, the experimentally derived value of 4.8-5.0 eV was adopted. This approach is sound because the experimental value reflects the statistical distribution of radii and chiral indices found in real SWNT samples while a calculated value would be biased by the selection of a particular type of tube. Comparing the electronic chemical potentials of the polymer model compound ($\mu_p$=−5.1) with the range determined for SWNT ($\mu_{NT}$=−4.8 to −5.0), it is apparent that chemical potential equalization will drive partial charge transfer from the SWNT to the polymer. This result agrees with the conclusions drawn from the experimental work described above and supports the idea that charge is transferred from the SWNT to the polymer matrix at equilibrium.

Finally, it is noted that other factors that have necessarily been excluded from these calculations would tend to further stabilize charge transfer interactions in this system. First, it is well known that a polar, polarizable environment, such as the bulk polymer in the present case, can significantly stabilize EDA complex formation. This is known to occur in both liquid and solid 'solutions', where reorganization of the surrounding media lowers the energy of the EDA complex relative to its unsolvated value, usually significantly. A second mechanism for stabilizing the EDA complex is geometric distortion of one or both components to a structure which, while unfavorable in isolation, is actually lower in energy when in conjunction with the other component of the complex. An example of this is the narrowing of the HOMO/LUMO gap which occurs upon deformation of aromatic π systems. An interesting example of this was recently described in a study of benzene adsorption on a platinum surface. It was found that distorting the planar aromatic core of the benzene molecule raised the HOMO energy and lowered the LUMO energy, which allowed for an improved match with the metal Fermi energy, and therefore, a more stable interaction.

We claim:

1. A dispersion of carbon nanotubes in a polymer matrix, which dispersion exhibits long term stability, the dispersion comprising: carbon nanotubes, which have been introduced into a polymer matrix and separated therein; the polymer matrix having moieties therein which are capable of a donor-acceptor complexation with the carbon nanotubes.

2. The dispersion of claim 1, wherein the carbon nanotubes are selected from the group consisting of single-walled carbon nanotubes, double-walled carbon nanotubes, few-walled carbon nanotubes, and multi-walled carbon nanotubes.

3. The dispersion of claim 2, wherein the carbon nanotubes have been separated in the polymer matrix by separation means selected from the group consisting of high-shear flow-processing and sonication.

4. The dispersion of claim 1, wherein the donor-acceptor complexation is effected by the polymer matrix having been previously functionalized.

5. The dispersion of claim 4, wherein the polymer matrix has been functionalized with either an electron-donating or an electron-accepting functional group, the carbon nanotubes exhibiting amphoteric behavior when forming donor-acceptor complexes.

6. The dispersion of claim 5, which is prepared by first mixing monomeric components of the polymer comprising the polymer matrix with the carbon nanotubes, followed by polymerization of the monomeric components.

7. The dispersion of claim 1, wherein the donor-acceptor complexation results in a transfer of electronic charge between the carbon nanotubes and the polymer matrix, resulting in an attractive interaction therebetween, which is neither an ionic nor a covalent bond between the carbon nanotubes and the polymer matrix.

8. The dispersion of claim 4, wherein the functionalized polymer matrix is a nitrile-functionalized polymer matrix.

9. A nanocomposite produced from the dispersion of carbon nanotubes in the polymer matrix of claim 1.

10. The nanocomposite of claim 9, which is fabricated as a film.

11. The nanocomposite film of claim 10, wherein the film comprises a polyimide.

12. The nanocomposite film of claim 11, wherein the polyimide is a functionalized polyimide.

13. The nanocomposite film of claim 12, wherein the functionalized polyimide is a nitrile-functionalized Polyimide.

* * * * *